United States Patent [19]

Coste

[11] Patent Number: 4,916,466
[45] Date of Patent: Apr. 10, 1990

[54] PLOTTER HAVING A SUPPORT PLATEN OF ANGULAR PROFILE

[75] Inventor: Francois R. Coste, Chennevières sur Marne, France

[73] Assignee: Océ Graphics France, S.A., Cretéil, France

[21] Appl. No.: 276,358

[22] Filed: Nov. 23, 1988

[30] Foreign Application Priority Data

Nov. 26, 1987 [FR] France ............... 87 16432

[51] Int. Cl.$^4$ .................. G01G 19/08; B41J 15/00
[52] U.S. Cl. ..................... 346/136; 400/578
[58] Field of Search ............. 346/136; 33/32.7; 400/29, 578

[56] References Cited

U.S. PATENT DOCUMENTS

| | | |
|---|---|---|
| 4,369,453 | 1/1983 | Brandt . |
| 4,512,505 | 4/1985 | Westly et al. ............ 346/136 X |
| 4,683,476 | 7/1987 | Ferrari et al. . |
| 4,734,987 | 4/1988 | Cleveland ............ 346/136 X |

FOREIGN PATENT DOCUMENTS 0002255 6/1979 European Pat. Off. .
0191222 8/1986 European Pat. Off. .

OTHER PUBLICATIONS

Hewlett-Packard Journal, Nov. 1981, pp. 34-36.

Primary Examiner—George H. Miller, Jr.
Attorney, Agent, or Firm—Bruce D. Riter

[57] ABSTRACT

A paper sheet (10) is supported by a platen (30) having a horizontal central portion (31, 41, 51) including the write path and having front and rear portions (40, 50) for supporting the sheet in front of and behind the central portion. Each of the front and rear portions comprises a plurality of plane faces (42, 43, 44; 52, 53, 54) interconnected by horizontal edges (46, 57; 56, 57) and forming increased angles (a, b), relative to the horizontal. The selected shape of the edges and the faces is such that when the sheet (10) is resting against the second and third edges (46, 47, 56, 57) it is constrained to keep off the first and second faces (42, 43, 52, 53) and to lift above the level of the central portion (31) prior to coming into contact therewith. Thus, the sheet (10) is constrained to pass from a convex shape to a concave shape via a line of inflection, thereby increasing the stiffness of the sheet and thus increasing its resistance to deformation and opposing any tendency of the sheet to lift off the platen at the write path.

13 Claims, 4 Drawing Sheets

PLOTTER HAVING A SUPPORT PLATEN OF ANGULAR PROFILE

BACKGROUND OF THE INVENTION

1. Field of the Invention

The present invention relates to drawing machines and more particularly to an X-Y plotter.

2. Description of Related Art

An X-Y plotter generally comprises first drive means for displacing a recording medium or sheet in a first direction (X); a write head carrying a writing tool; second drive means for displacing the writing tool in a second direction (Y) along a write path; a platen for supporting the sheet and having a horizontal central portion including the write path, and a front portion and a rear portion for supporting the sheet in front of and behind the central portion; and means for pressing the sheet against the platen, at least in the central portion thereof.

In a plotter of this type, a drawing is made on the sheet by combining displacement of the sheet in the first direction (X) and displacement of the writing tool in the second direction (Y) which is generally perpendicular to the first.

While a drawing is being made, each interruption of a plotted line is achieved by raising the writing tool from a lowered position in which it is in contact with the sheet to a raised position in which it is no longer in contact with the sheet.

A line is started by performing the opposite movement.

When the tool is in the raised position, it is essential to avoid any accidental contact between the sheet and the writing tip since that will mark the sheet and make the drawing unusable.

However, when the sheet is driven, for example by means of a rotary drum with the margins of the sheet being pressed against the drum by presser wheels, and no means are provided for holding the sheet against the support platen, the sheet deforms and it inevitably moves away from the platen under certain conditions, in particular when sudden accelerations are imparted to the sheet. By lifting in this way, the sheet may come into contact with the writing tool, even when the writing path is close to the location where the sheet is pressed against the drive drum.

The sheet may be held more reliably against the platen, or at least against the central portion thereof, by setting up suction beneath the sheet via openings formed through the platen. One such disposition is shown in copending U.S. patent application Ser. No. 055,699, filed May 29, 1987 (corresponding to French patent application Nos. 2,599,300 and 2,599,301 in the name of Benson). These documents also show front and rear portions of the platen in the form of skirts having sheet support surfaces each comprising a plurality of faces which are interconnected to one another by rounded portions, with a first face extending the central portion and with other faces extending the first face downwardly at increasing slopes relative to the horizontal.

It can happen, under certain circumstances, that holding the sheet down by suction in the central portion of the platen is insufficient. This happens when the sheet is caused to resonate under the action of its drive means, in particular when the drive means impose rapid displacement of the sheet back and forth along the X direction. The sheet is then subjected to high amplitude wave motion at its front and rear ends, and this motion propagates into the portion of the sheet supported by the platen and can be strong enough to lift the sheet off the platen along the write path by virtue of the low resistance of the sheet to deformation.

In order to prevent, or at least limit, the extent to which the sheet lifts off the platen, and thus avoid the drawbacks which result therefrom, proposals have been made to bend the sheet so as to increase its stiffness and thus increase its resistance to deformation. The sheet is bent by using a concave support platen with a V-shaped cross-section, or the like, combined with suction means for forcing the sheet to follow the shape of the platen. One such disposition is described in U.S. Pat. No. 4,369,453 and in an article by R. J. Kaplan and R. S. Townsend published in the "Hewlett-Packard Journal", November 1981, pp. 33–36.

Nonetheless, this prior disposition suffers from drawbacks.

The write path is situated substantially in the middle of the platen, i.e. in its hollow. Thus, in spite of the suction exerted through the platen, the sheet tends to lift off the platen when a drive force is applied to the sheet. The height of the sheet above the platen increases until it reaches a maximum and then decreases, while the sheet reaches its maximum speed at the end of acceleration in the X direction. If the writing tool is not raised high enough, or if the sheet is put into motion after too short a delay has elapsed relative to the tool being raised, the surface of the sheet may strike the tip of the tool. In order to prevent contact between the sheet and the raised tool, various different means are used.

A first means consists in raising the tool to a sufficient height. For a given degree of suction, the maximum height reached by the sheet depends on the nature of the sheet, on its thickness, and above all on its format (sheet size). Each format (sheet size) therefore corresponds to a different minimum height above which the tool must be raised. If it is desired to optimize the time taken to make a drawing regardless of format, it is necessary to provide means for automatically determining the minimum height to which the tool must be raised as a function of the format of the sheet, in order to increase the time taken for raising and lowering the tool only when that is necessary, i.e. when using large formats.

Other means consist in using mechanical means for preventing the sheet from striking the raised tool, for example a bumper fixed adjacent to the tip of the tool or an appendix which extends over the entire length of the plotter in front of and behind the platen and which accompanies the sheet as it moves in order to limit interfering movements of the sheet.

A second difficulty related to using a concave support platen lies in the need to find a compromise between the radius of curvature imparted to the sheet and the V-shape of the platen. The radius of curvature must be fairly small in order to ensure that the increase in stiffness provided by bending the sheet is sufficient for stabilizing sheet movement. However, the radius of curvature must be fairly large in order to avoid permanently deforming the sheet. Unfortunately, of the various sheet materials that may be used, some are liable to be permanently deformed if they are subjected to a relatively small radius of curvature, in particular paper having a density of 90 grams per square meter (g/m2).

Finally, another drawback of a concave support platen stems from its requirement of a segmented drum for driving the paper. If a continuous drum were to be used, i.e. a drum of constant diameter whose top generator line is flush with the surface of the platen and passes through an elongate opening formed therein, then the sheet could penetrate into the gap between the drum and the rear write path (i.e. the portion of the platen situated on the opposite side of the drum to the side having the normal write path) while the sheet is being loaded onto the plotter. In order to ensure that paper loading takes place properly, it becomes necessary to segment the drum, i.e. to provide portions of smaller diameter making it possible to maintain platen continuity level with said drum portions, thereby guiding the sheet while it is being loaded. Thus, the use of a concave platen prevents a continuous drum being used in a sheet-fed plotter because of the impossibility of ensuring that proper sheet feeding can be performed automatically.

SUMMARY OF THE INVENTION

The object of the present invention is to provide a plotter provided with means that effectively limit the amplitude to which a sheet lifts off the platen at the write path, so as to avoid any accidental marking of the sheet by the writing tool when the tool is in its raised position.

More particularly, the object of the present invention is to provide a plotter having a sheet support platen whose geometry is designed to impart increased stiffness to the sheet while avoiding the above-mentioned drawbacks of concave platens.

According to the invention, an X-Y plotter comprises:
- first drive means for displacing a recording sheet in a first direction (X);
- second drive means for displacing a writing tool in a second direction (Y) along a write path with respect to the sheet, and
- a platen for supporting the sheet and having a horizontal central portion including the write path, and front and rear portions for supporting the sheet in front of and behind the central portion;
- each of said front and rear portions comprising a first plane face connected to the central portion by a first horizontal edge and forming, relative to the horizontal, a first angle a and at least one second plane face connected to the first plane face by a second horizontal edge having a radius of curvature less than the estimated value of the natural radius of curvature of the sheet, said second face forming, relative to the horizontal, a second angle b which is greater than the first angle, and having a third horizontal edge at its bottom portion, with the edges and the faces having a geometry chosen so that the sheet by resting on the second and third edges, is constrained to keep off the first and second faces and to lift above the level of the central portion prior to coming into contact therewith.

By virtue of this particular geometry, the front and rear portions of the platen, i.e. its skirts, contribute to preventing the sheet from lifting in the middle portion of the platen.

By lifting off the first and second faces, the sheet leaves spaces over said faces with air being imprisoned in said spaces, thereby providing a damping effect on movement of the sheet in directions perpendicular to the faces of the skirts.

Further, when a sheet enters resonance, the edges of the skirt hinder the propagation of the wave motion to which the free portions of the sheet hanging over the front and the back of the tracer are subjected, thereby preventing the wave motion from travelling all the way to the write path. The impacts of the sheet against the edges of the skirts dissipate the energy and damp interferring motion.

In addition, since the sheet is constrained to rise to a greater height than the central portion of the platen prior to returning to the level of said central portion, the sheet changes from a convex shape to a concave shape forming a line of inflection which contributes to increasing the stiffness of the sheet, and consequently increases its resistance to deformation. The symmetry of the platen reinforces these effects.

BRIEF DESCRIPTION OF THE DRAWINGS

The invention will be better understood from reading the following description made by way of non-limiting example and with reference to the accompanying drawings, in which.

DETAILED DESCRIPTION OF THE INVENTION

Figure 1:
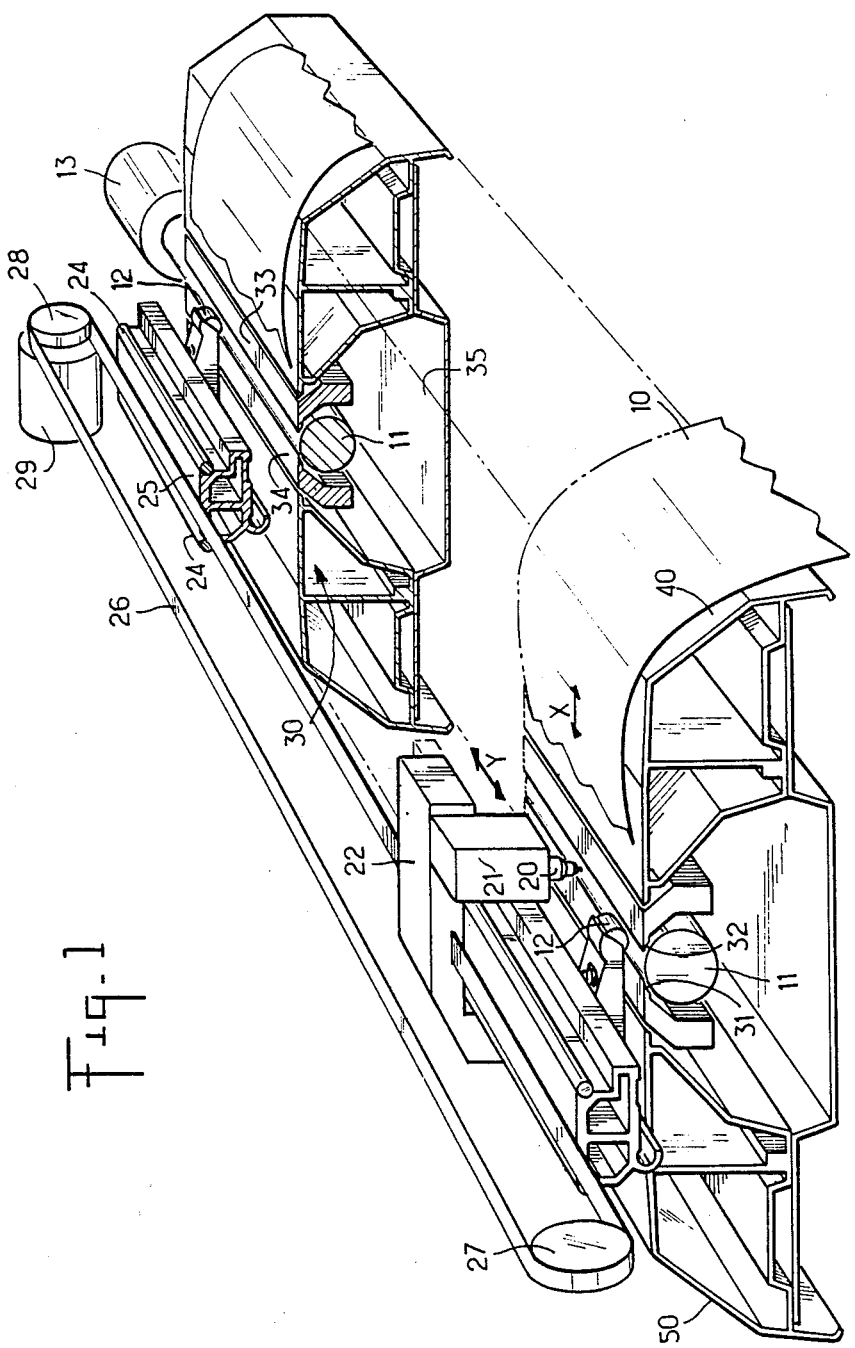
FIG. 1 is an overall diagrammatic view of an embodiment of a plotter in accordance with the invention.
Figure 2:
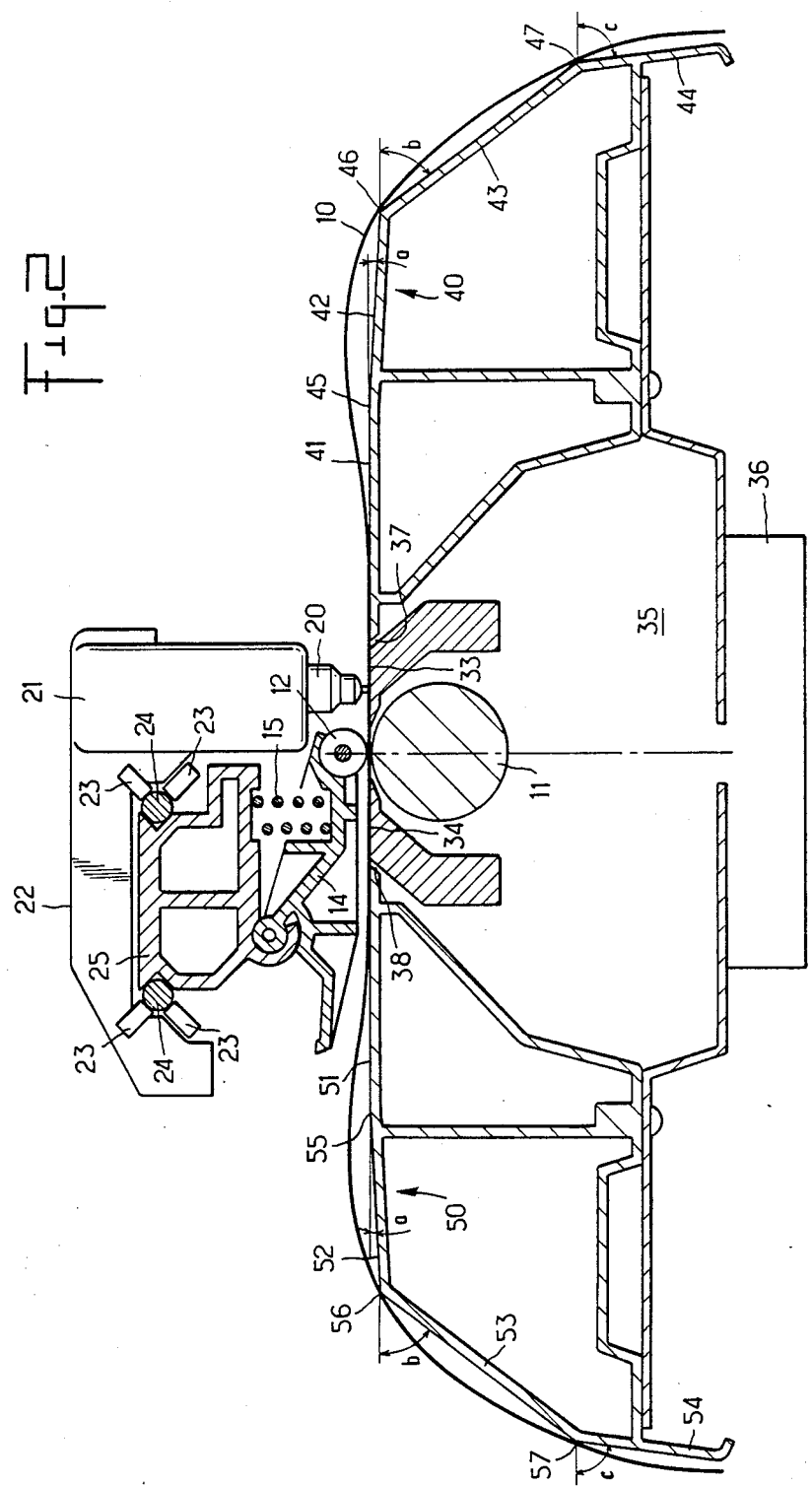
FIG. 2 is a side elevation in partial section through the FIG. 1 plotter.

FIGS. 1 and 2 show a sheet-fed plotter for plotting lines on a sheet 10 (e.g. a sheet of paper) by combining rectilinear translation motion of a writing tool 20 which is carried along a Y direction by a write head 21, with translation motion of the sheet 10 along an X direction which is perpendicular to the Y direction.

The write head 21 is mounted on a carriage 22 which carries wheels 23 running on rails 24 fixed to a beam 25 extending parallel to the Y direction. The writing tool 20 is moved along the Y direction by driving the carriage 22 back-and-forth in translation by any appropriate means. In the example shown, an endless belt 26 is fixed to the carriage 22 and passes at one end of the beam 25 over a return pulley 27 and at the other end of the beam over a drive pulley 28 coupled to a motor 29.

Means, e.g., electromagnetic means (not shown) are provided on the write head 21 for moving the writing tool 20 back-and-forth between a raised (rest) position in which it does not come into contact with the sheet 10, and a lowered (working) position in which the tip of the tool 20 is in contact with the sheet 10. Such means for raising and lowering the writing tool either by displacing the tool 20 relative to the write head 21 or else by displacing the write head 21 relative to the carriage 22 are themselves well-known, such that detailed description thereof is not required herein. Reference may be made, for example, to U.S. Pat. No. 4,683,476, issued July 28, 1987, and copending U.S. patent application Ser. No. 175,045, filed Mar. 30, 1988 (corresponding respectively to French patent application Nos. 2.572.572 and 87.05166 in the name of Benson).

The sheet 10 is moved in the X direction by rotating a constant diameter drive drum 11 whose axis extends parallel to the Y direction and which co-operates with two pressure wheels 12 which exert pressure on the margins of the sheet 10 tending to press said margins against the drum 11. The drum is rotated by a motor 13 whose outlet shaft is, for example, directly coupled to the shaft of the drum, as described in above-mentioned French patent application Nos. 2.599.300 and 2.599.301.

The pressure wheels 12 are mounted free to rotate at the ends of respective arms 14 which themselves are capable of pivoting relative to the beam 25 about an axis parallel to the Y direction. The force with which each wheel 12 is pressed against the drum 11 is provided by a respective spring 15 whose ends bear against the arm and a bottom face of the beam 25.

A platen 30 supports the sheet 10 beneath the write path, i.e. the area in which the writing tool 20 is active, and also in adjacent front and rear zones of the plotter.

The platen 30 has a horizontal central portion 31. In the middle of the central portion 31, the platen has an elongate opening 32 extending lengthwise along the Y direction with the top generator line of the drum 11 projecting therethrough so as to be flush or slightly proud (protruding). On the front side of the opening 32, the central portion of the platen includes the write path 33, i.e. the area of the platen situated along the path of the writing tool 20. The central portion of the platen is symmetrical about a vertical plane passing through the axis of the drum 11 and therefore includes an area 34 behind the opening 32 which is referred to below as the rear write path.

The platen 30 includes two skirts 40 and 50 disposed symmetrically about the plane P in front of and behind the central portion 31 of the platen. Since the two skirts are identical, only one of them, e.g. the front skirt 40, is described in detail below.

The supporting surface of the skirt 40 comprises a plurality of plane faces 41, 42, 43, and 44 which are interconnected to one another along horizontal edges 45, 46, and 47.

The plane face 41 extends horizontally level with the write path 33. The plane face 42 is connected to the horizontal face along edge 45 and slopes at an angle a relative to the horizontal. The plane face 43 is connected to the sloping face 42 along the edge 46 and itself slopes relative to the horizontal at an angle b which is greater than the angle a. Finally, the plane face 44 is connected to the sloping face 43 along the edge 47 and itself slopes relative to the horizontal at an angle c which is greater than the angle b. As a result, the faces 42, 43, and 44 extend the horizontal face 41 downwardly at increasing angles of slope.

Similarly, the support surface of the skirt 50 comprises a horizontal plane face 51 extending the rear write path 34 and having plane faces 52, 53, and 54 of increasing slopes a, b, and c connected thereto via edges 55, 56, and 57.

In order to contribute to holding the sheet 30 against the central portion 31 of the platen during writing, suction is set up beneath the sheet 30. To this end, a pressure of less than atmospheric pressure is maintained in a chamber 35 situated beneath the central portion of the platen, by means of a suction device such as a fan 36 (FIG. 2). The chamber 35 communicates with the outside via the gap 32 on either side of the drum 11 and via gaps 37 and 38 disposed, respectively, between the write path 33 and the skirt 40, and between the write path 34 and the skirt 50.

The sheet-holding function exerted by the platen 30 is now described with reference to diagrammatic FIGS. 3 and 4 which show only the platen 30 and the sheet 10.

Figure 3:
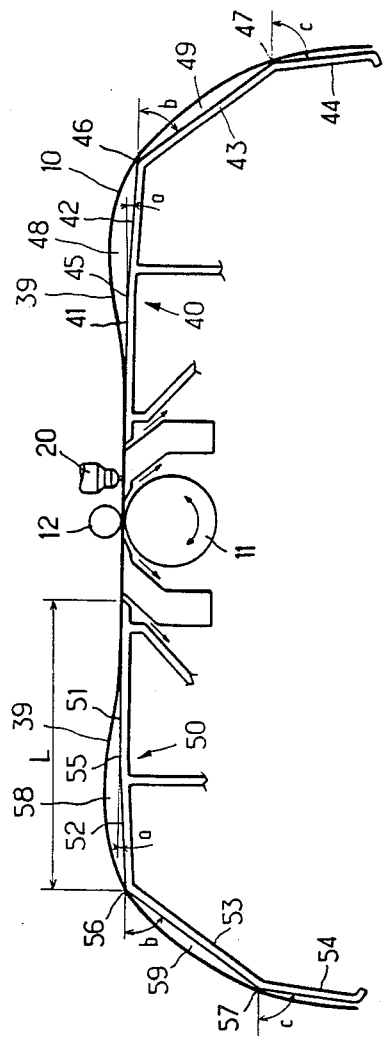
FIGS. 3 and 4 are diagrams showing the action of the skirts of the sheet support platen for imparting a shape to the sheet which increases its stiffness and for damping interferring motion of the sheet.
Figure 4:
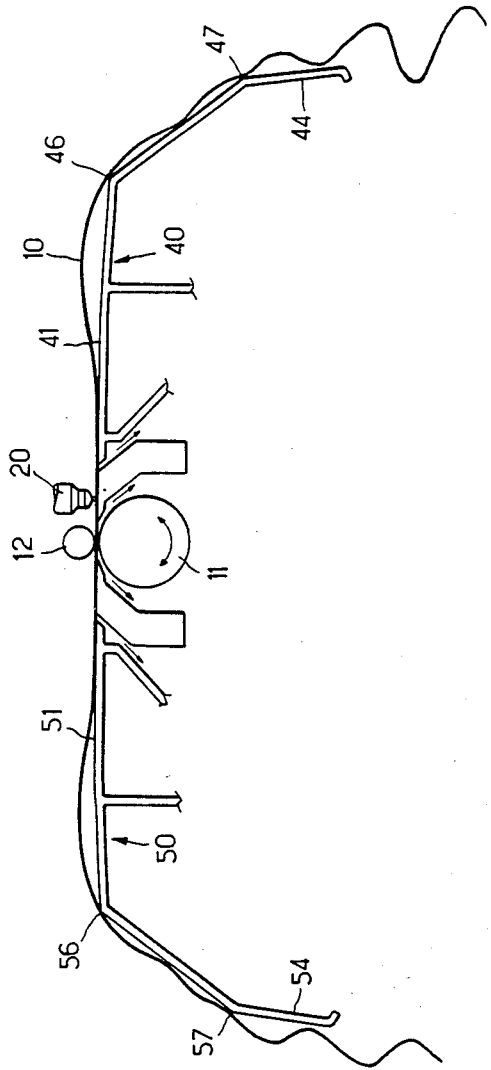

As shown in FIG. 3, the sheet 10 adopts a curved profile over the plotter. In particular, by resting against the edges 46 and 56, the sheet rises above the faces 41 and 51 prior to resting against the faces under the effects of gravity and the suction exerted beneath the central portion of the platen. As a result, the sheet changes from being convex in shape over the front portion of the front skirt and also over the rear portion of the rear skirt to being concave in shape over the central portion of the platen and over the adjacent portions of the skirts, with the changeovers from the convex shape to the concave shape occurring along lines of inflection 39. The curvature and the inflection thus imparted to the sheet considerably increase its stiffness and its resistance to deformation, in particular in the X direction. Further, the presence of a concave shape on either side of the central portion of the platen reinforces these effects.

The shape of the sheet 10 as illustrated in FIG. 3 results from the particular geometry of the skirts and in particular from the characteristics of the edges 46 and 56.

Firstly, the edges 46 and 56 must have a radius of curvature which is less than the estimated natural radius of curvature of the sheet 10 in order to oblige the sheet to lift off the faces 42 and 52. The term "natural radius curvature of the sheet 10" is used to designate the minimum radius of curvature which the sheet can follow without giving rise to permanent deformation. The natural radius of curvature varies depending on the nature of the material from which the sheet is made. For example, the natural radius of curvature for the stiffest sheets commonly used in A0 format plotters, e.g. 90 g/m2 paper, is equal to 40 mm. The estimated value of the radius of curvature is thus chosen to be 40 mm.

Secondly, the positions of the edges 46 and 56 should be such that the sheet 10 lifts off the horizontal level of the faces 41 and 51. This condition is satisfied with the edges 46 and 56 being situated at a horizontal level which is close to that of the faces 41 and 51, i.e. for A0 format, with the vertical distance h between the edges 46 and 56 and the plane of the faces 41 and 51 being less than 6 mm.

Since the different types of sheet used have different stiffnesses and consequently different natural radiuses of curvature, different sheets come into contact with the face 41 or 51 at different distances measured horizontally from the edge 46 or 56. The distance L between the edge of the write path and the edge 46 or 56 is therefore chosen to be long enough to ensure that all of the various types of paper used do indeed come into contact with the face 41 or 51. This distance L must be greater than the estimated radius of curvature of the sheet, i.e. 40 mm in this case. Further, the edges 46 and 56 must not be too far from the write path so as to ensure that the change in radius of curvature at each line of inflection is considerable and imparts an appreciable increase in stiffness to the sheet. For A0 format, this condition is satisfied when the horizontal distance L is less than 160 mm.

FIG. 3 also shows that by taking up a curved profile, the sheet 10 rests, to the front, against the horizontal face 41 and against the edges 46 and 47, thereby forming spaces 48 and 49 between itself and the platen. Similarly, to the rear, the sheet 10 rests against the horizontal face 51 and against the edges 56 and 57, thereby forming spaces 58 and 59 between itself and the platen.

The air imprisoned in the spaces 48, 49, 58, and 59 can arrive or escape only via the ends of these spaces at the margins of the sheet. This provides damping means which are increasingly effective with increasing sheet width. When the sheet 10 moves in the nornal direction relative to the platen, changes in the volume of air imprisoned in the spaces 48, 49, 58, and 59 give rise to changes in the speed of the air at the ends of these spaces, and thus to dissipation of energy since the air flow is turbulent at the ends.

The desire that effective damping should take place even for large amplitude oscillations of the sheet without the sheet lifting off the edges, means that a large volume of air should be imprisoned in each space, i.e. each skirt should have a small number of faces with each face extending a considerable distance between the edges which delimit it.

The number and dimensions of the sloping faces of the skirts are also selected for obtaining the best solutions to problems relating to friction and to electrostatic charge.

Electrostatic charge is largely responsible for increasing the friction between the platen and the write medium. This charge develops when two non-conducting surfaces come into contact. This takes place, in particular, when the medium is a polyester film, sine polyester is one of the est dielectric materials.

In order to combat the generation of electrostatic charge, the total area of the sheet coming into contact with the platen must be limited. With the skirts 40 and 50, this is obtained by virtue of the fact that the sheet 30 rests in front of and behind the horizontal faces 41 and 51 solely on the edges 46, 47, 56, and 57, which edges are sharp, i.e. they have a radius of curvature which is as small as possible and less than 5 mm.

Further, the platen 30 may advantageously be provided with a coating vehicle is suitable either for reducing and for dissipating electrostatic charge, e.g. a coating of carbon-filled polytetrafluoroethylene, or else suitable for reducing the formation of such charge, e.g. an anti-static varnish.

The desire for a good damping effect and as little contact as possible between the sheet and the skirts make it preferable for each skirt to have two inclined faces 43 and 44 (or 53 and 54) beyond the sloping face 42 (or 52). The sloping face 43 (53) extends at an angle b relative to the horizontal lying in the range $50\times$ to $65\times$, and the distance between its edges 46 and 47 (56 and 57) should be greater than 25 mm. For such a distance, the angle b should be greater than a first value at which the sheet no longer lifts off the level of the base 41 (51) and less than a second value for which the sheet begins to lift off the edge 47.

The last sloping face 44 (54) of each skirt extends the face 43 (53) in order to impart a desirable curve to the sheet, with the bottom edge of the face being curved inwardly and serving as a line against which the hanging portion of the sheet can rest. The bottom edge of the face 44 (54) and the edges 46 and 47 (56 and 57) are inscribed in a circle whose radius is greater than the estimated value (40 mm) of the natural radius of curvature of the sheet in order to ensure that the sheet can rest naturally against all three edges.

An additional function of the skirts 40 and 50 is to oppose the propagation to the wire path of wave motion in the sheet 10 when the sheet enters resonance. FIG. 4 shows the sheet 10 in resonance with high amplitude waves at its front and rear free ends. These waves are damped by impact against the skirts 40 and 50 and they are practically non-existent where the sheet comes into contact with the horizontal faces of the skirts.

Figure 5:
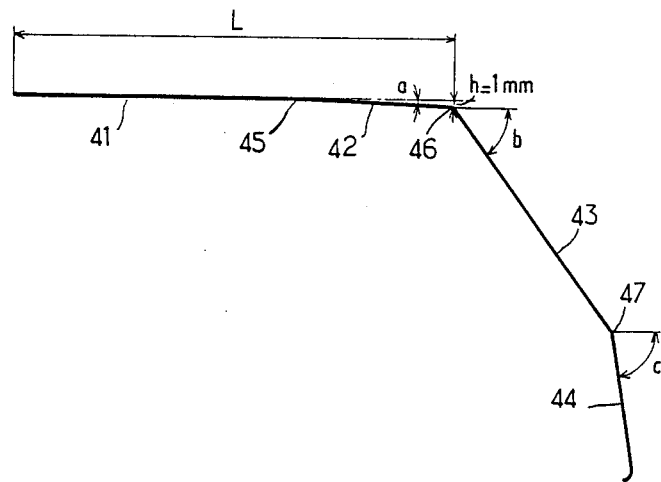
FIG. 5 is a diagram showing a preferred embodiment of a profile for the skirt of a sheet support platen.

FIG. 5 shows a preferred embodiment of a skirt profile for a multiformat plotter. Each skirt, e.g. the skirt 40, has the following dimensions:

its radius of curvature at the edges 46 and 47 is equal to 2 mm;

its horizontal face 41 extends from an edge situated at 25 mm from the axis of the drum and to the edge 45 over a distance of 40.5 mm;

its sloping face 42 extends from the edge 45 to the edge 46 which is situated at a vertical distance $h = 1$ mm below the face 41 and at a horizontal distance of 41.5 mm from the edge 45, thereby giving an angle of slope a equal to about $1.4\times$;

its sloping face 43 extends from the edge 46 to the edge 47 which is a vertical distance of 48 mm below the face 41 and at a horizontal distance 75 mm from the edge 45, thereby giving an angle of slope b equal to about $55\times$; and its sloping face 44 extends beyond the edge 47 to the free edge of the skirt which is situated at a vertical distance of 85 mm below the face 41 and at a horizontal distance of 80.5 mm from the edge 45, thereby giving an angle of slope c equal to about $81\times$.

I claim:

1. An X-Y plotter comprising:
first drive means for displacing a recording sheet in a first direction (X);
second drive means for displacing a writing tool in a second direction (Y) along a write path with respect to the sheet, and
a platen for supporting the sheet and having a horizontal central portion including the write path, and front and rear portions for supporting the sheet in front of and behind the central portion;
each of said front and rear portions comprising a first plane face connected to the central portion by a first horizontal edge and forming, relative to the horizontal, a first angle a and at least one second plane face connected to the first plane face by a second horizontal edge having a radius of curvature less than the estimated value of the natural radius of curvature of the sheet, said second face forming, relative to the horizontal, a second angle b which is greater than the first angle, and having a third horizontal edge at its bottom portion, with the edges and the faces having a geometry chosen so that the sheet by resting on the second and third edges, is constrained to keep off the first and second faces and to lift above the level of the central portion prior to coming into contact therewith.

2. A plotter according to claim 1, wherein the radius of curvature of the second edge is less than 40 mm.

3. A plotter according to claim 2, wherein the radius of curvature of the second edge is as small as possible, and less than 5 mm.

4. A plotter according to claim 1, wherein the vertical distance h between the level of the first face and the second edge is less than 6 mm.

5. A plotter according to claim 4, wherein the horizontal distance between the write path and the second edge is greater than 40 mm.

6. A plotter according to claim 1, wherein the second angle b lies between $50\times$ and $65\times$, and in that the distance between the second and third edges is greater than 25 mm.

7. A plotter according to claim 1, wherein each of the front and rear portions of the platen includes a third plane face connected to the second face via the third horizontal edge and forming, relative to the horizontal, a third angle c greater than the second angle b and less than 90×, the third face having a geometry chosen so that the sheet rests against the bottom edge of the third face and against the second and third edges while keeping off the second and third faces.

8. A plotter according to claim 7, wherein the profile formed by the bottom edge of the third face and by the second and third edges is inscribed in a circle of radius greater than 40 mm.

9. A plotter according to claim 7, wherein the first angle a is substantially equal to 1.4×, the second angle b is substantially equal to 55×, and the third angle c is substantially equal to 81×.

10. A plotter according to claim 1 wherein the first drive means comprise a rotary drum having a horizontal axis perpendicular to the first direction (X) and having a top generator line substantially flush with the level of the central portion of the platen, and passing through an opening formed therein, and means for pressing the sheet against the rotary drum, the support surface of the platen being symmetrical about a vertical plane passing through the axis of the drum.

11. A plotter according to any one of claims 1 to 10, further comprising means for pressing the sheet against the central portion of the platen including gaps formed in the platen and suction means for reducing the air pressure below the sheet through said gaps.

12. A plotter according to claim 1, wherein the support surface of the platen is provided with an electrically conductive coating.

13. A plotter according to claim 1, wherein the support surface of the platen is provided by an anti-static coating.

* * * * *